US012795280B2

(12) United States Patent
Albahri et al.

(10) Patent No.: US 12,795,280 B2
(45) Date of Patent: Nov. 10, 2026

(54) HEARING DEVICE WITH MULTICOIL BALANCED ARMATURE RECEIVER

(71) Applicant: Knowles Electronics, LLC, Itasca, IL (US)

(72) Inventors: Shehab Albahri, Hanover Park, IL (US); Yahui Zhang, Schaumburg, IL (US); Christopher Monti, Elgin, IL (US)

(73) Assignee: Knowles Electronics, LLC, Itasca, IL (US)

( * ) Notice: Subject to any disclaimer, the term of this patent is extended or adjusted under 35 U.S.C. 154(b) by 296 days.

(21) Appl. No.: 18/608,852

(22) Filed: Mar. 18, 2024

(65) Prior Publication Data

US 2025/0294280 A1 Sep. 18, 2025

(51) Int. Cl.
*H04R 1/10* (2026.01)

(52) U.S. Cl.
CPC .................................. *H04R 1/1016* (2013.01)

(58) Field of Classification Search
CPC ........ H04R 1/1016; H04R 11/02; H04R 3/04; H04R 1/24; H04R 1/1066; H04R 1/10; H04R 25/609; H04R 1/025; H04R 1/1075
See application file for complete search history.

(56) References Cited

U.S. PATENT DOCUMENTS

| | | | |
|---|---|---|---|
| 5,610,989 A | 3/1997 | Salvage et al. | |
| 5,708,721 A | 1/1998 | Salvage et al. | |
| 7,050,602 B2 | 5/2006 | Miller | |
| 9,872,109 B2 | 1/2018 | Miller et al. | |
| 11,272,294 B2 | 3/2022 | Albahri et al. | |
| 11,477,579 B2 | 10/2022 | King | |
| 11,671,778 B1 * | 6/2023 | Jacob ....................... | H04R 1/24 381/423 |
| 11,729,556 B2 | 8/2023 | Zhang et al. | |
| 2005/0111688 A1 | 5/2005 | Wilmink | |
| 2006/0008110 A1 | 1/2006 | van Halteren | |
| 2006/0140436 A1 | 6/2006 | de Moel | |
| 2006/0239488 A1 | 10/2006 | Geschiere | |
| 2013/0272564 A1 | 10/2013 | Miller | |
| 2016/0044420 A1 | 2/2016 | Albahri et al. | |
| 2016/0183005 A1 | 6/2016 | Miller | |

(Continued)

OTHER PUBLICATIONS

Warren, Daniel et al., U.S. Appl. No. 62/047,099, "Radially Layered Coils in a Receiver", filed Sep. 8, 2014.

(Continued)

*Primary Examiner* — Angelica M McKinney
(74) *Attorney, Agent, or Firm* — Hickman Becker Bingham Ledesma LLP; Matthew Loppnow

(57) ABSTRACT

An ear-worn hearing device including a balanced armature receiver is disclosed. A diaphragm separates an interior of the receiver housing into front and back volumes, a multicoil motor located in the housing is electrically connected to contacts of a terminal board integrated with the hearing device, wherein electrical connections of the multicoil motor and a capacitor component integrated with the terminal board are configured to change an electrical impedance of the balanced armature receiver based on a frequency of an electrical signal applied to the multicoil motor. The hearing device can be configured as an in-the-ear (ITE) hearing device among others.

21 Claims, 15 Drawing Sheets

(56) References Cited

U.S. PATENT DOCUMENTS

| | | | | |
|---|---|---|---|---|
| 2019/0273989 | A1* | 9/2019 | Granicki | H04R 11/02 |
| 2019/0342666 | A1* | 11/2019 | Dayton | H04R 11/02 |
| 2020/0213787 | A1* | 7/2020 | Houcek | H04R 1/1075 |
| 2021/0204064 | A1* | 7/2021 | Zhang | H04R 1/025 |
| 2021/0204079 | A1* | 7/2021 | Badillo | H04R 25/609 |
| 2021/0385582 | A1* | 12/2021 | King | H04R 1/10 |
| 2022/0150643 | A1* | 5/2022 | Albahri | H04R 1/10 |
| 2022/0208441 | A1* | 6/2022 | Scheleski | H04R 1/1066 |
| 2025/0294289 | A1* | 9/2025 | Zhang | H04R 3/04 |

OTHER PUBLICATIONS

Warren, Daniel et al., U.S. Appl. No. 62/047,101, “End-to-End Coils in a Receiver”, filed Sep. 8, 2014.
Warren, Daniel et al., U.S. Appl. No. 62/047,157, “Bifilar Coil in a Receiver”, filed Sep. 8, 2014.
Warren, Daniel et al., U.S. Appl. No. 62/047,104, “A Receiver with a Motor Having Anti-Corrosive and Structurally Sound Coil”, filed Sep. 8, 2014.
Warren, Daniel et al., U.S. Appl. No. 62/047,112, “Receiver with Self-Bonding Coil”, filed Sep. 8, 2014.
Warren, Daniel et al., U.S. Appl. No. 62/047,121, “Receiver with Potted Coil”, filed Sep. 8, 2014.
Warren, Daniel et al., U.S. Appl. No. 62/047,129, “Receiver with Coil Having Skirts for Increased Surface Area”, filed Sep. 8, 2014.
Warren, Daniel et al., U.S. Appl. No. 62/047,140, “Receiver with Coil Having Stand-off Ribs”, filed Sep. 8, 2014.

* cited by examiner

HEARING DEVICE WITH MULTICOIL BALANCED ARMATURE RECEIVER

FIELD OF THE DISCLOSURE

The present disclosure relates generally to hearing devices and more particularly to ear-worn hearing devices comprising a multicoil balanced armature receiver.

BACKGROUND

Sound-producing balanced armature receivers (also referred to herein as "receivers") are known for having small size, high power efficiency, and high fidelity, making them particularly suitable for use in ear-worn hearing devices. Such devices include hearing aids, wireless earbuds, sound amplifiers and audio monitors, among other body worn hearing devices. Receivers generally comprise a housing having an interior separated into front and back volumes by a diaphragm. A motor connected to the diaphragm comprises an armature (also referred to as a "reed") fastened to a yoke and having an end portion movably located between permanent magnets retained by the yoke. An electrical signal applied to a coil coupled to the armature causes the armature to actuate the diaphragm thereby emitting sound from a sound port of the front volume.

Receivers typically have a relatively low electrical impedance to increase acoustic output. Receiver impedance is predominantly resistive at lower frequencies and power consumption is relatively high due to the low resistance since average power consumption $(P_{avg})=V_{rms}^2/R$ for a purely resistive impedance. Large amplitude signals at lower frequencies can produce transient voltage drops sufficient to cause hearing device operating systems to restart, known as rebooting. At higher frequencies, acoustic output of the receiver is reduced due to increased impedance largely attributable to coil inductance. Thus, there is an ongoing need for improvements in ear-worn hearing devices comprising one or more balanced armature receivers.

BRIEF DESCRIPTION OF THE DRAWINGS

The objects, features and advantages of the present disclosure will become more fully apparent upon consideration of the following detailed description and appended claims in conjunction with the accompanying drawings. The description and drawings depict representative embodiments and suggest others and are not considered to limit the scope of the disclosure.

Those of ordinary skill in the art will appreciate that the drawings are illustrated for simplicity and clarity and therefore may not be drawn to scale and may not include well-known features, that the order of occurrence of actions or steps may be different than the order described and that the order of occurrence of such actions or steps may be performed concurrently unless specified otherwise, and that the terms and expressions used herein have meaning understood by those of ordinary skill in the art except where a different meaning is specifically attributed to them herein.

DETAILED DESCRIPTION

The disclosure relates generally to car-worn hearing devices comprising one or more balanced armature receivers and more particularly comprising at least one multicoil balanced armature receiver. Such hearing devices include, but are not limited to, receiver-in-canal (RIC) devices, completely-in-the canal (CIC) devices, in-the-car (ITE) devices, behind-the-car (BTE) devices, car-worn sound amplifiers, in-car audio monitors, and true wireless stereo (TWS) devices and other wireless earphones, among other body-worn hearing devices. Representative examples are described further herein.

The multicoil receivers described herein generally comprise a housing containing a diaphragm that separates an interior of the housing into a back volume and a front volume acoustically coupled to a sound port of the housing. A multicoil motor located in the housing comprises an armature having a movable portion located between permanent magnets retained by a yoke and connected to the diaphragm. A terminal board integrated with the balanced armature receiver comprises a plurality of contacts electrically connected to first and second coils of the motor. A capacitor component is integrated with the terminal board and electrically connected to contacts of the terminal board. The electrical connections of the first and second coils and the capacitor component to the terminal board can be configured to change an electrical impedance of the balanced armature receiver based on a frequency of an electrical signal applied to the multicoil motor. Representative examples are described further herein.

Figure 4:
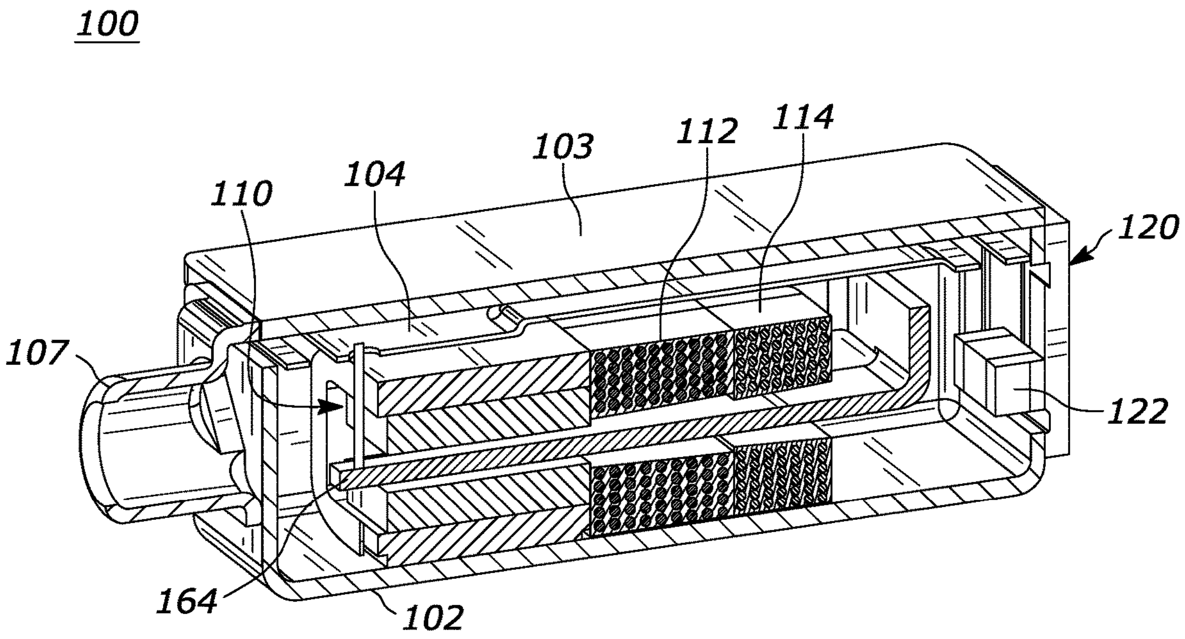
FIG. 4 is a sectional view of a receiver according to another embodiment.
Figure 5:
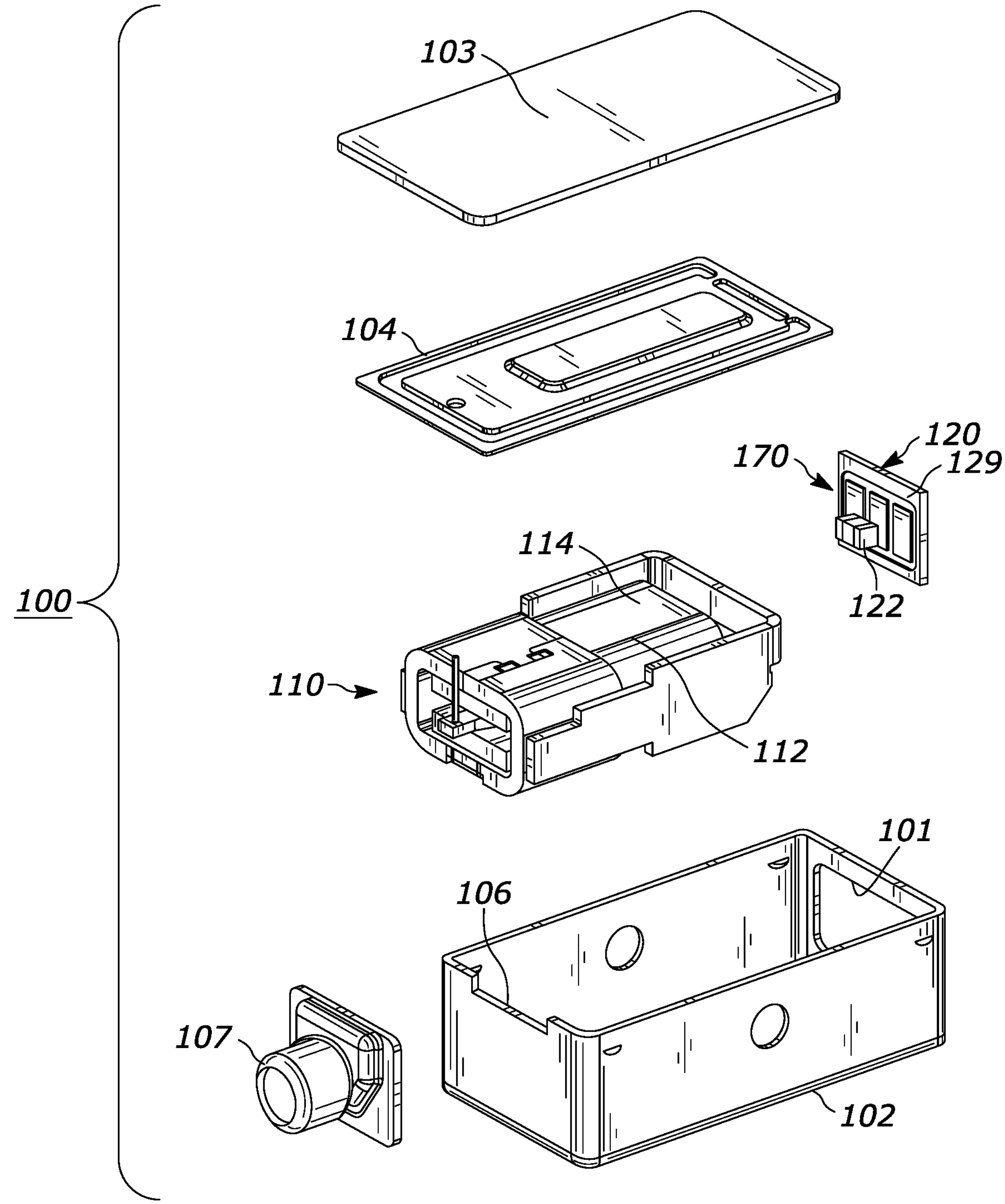
FIG. 5 is an exploded view of the receiver of FIG. 4.
Figure 6:
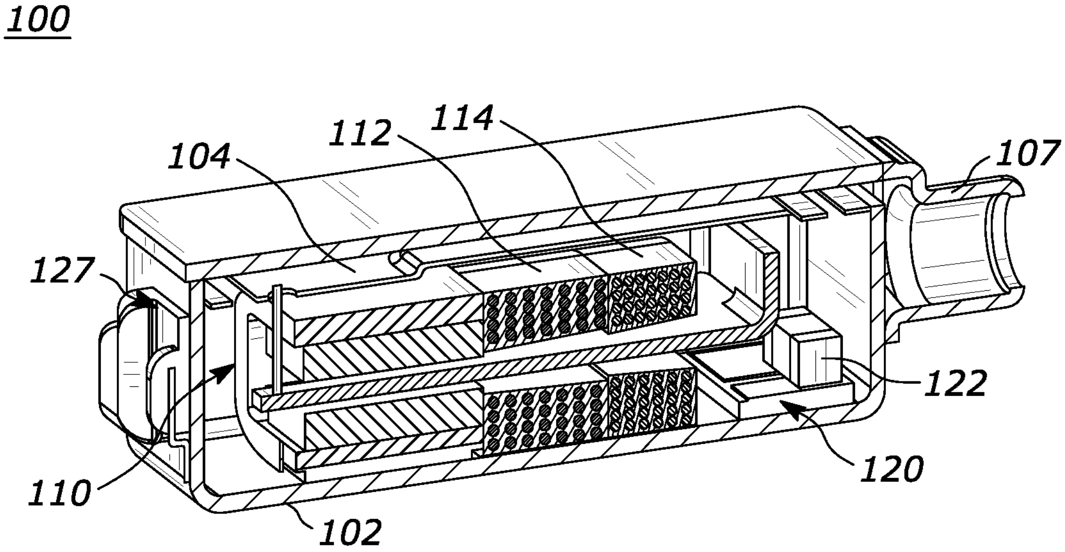
FIG. 6 is a sectional view of a receiver according to yet another embodiment.
Figure 7:
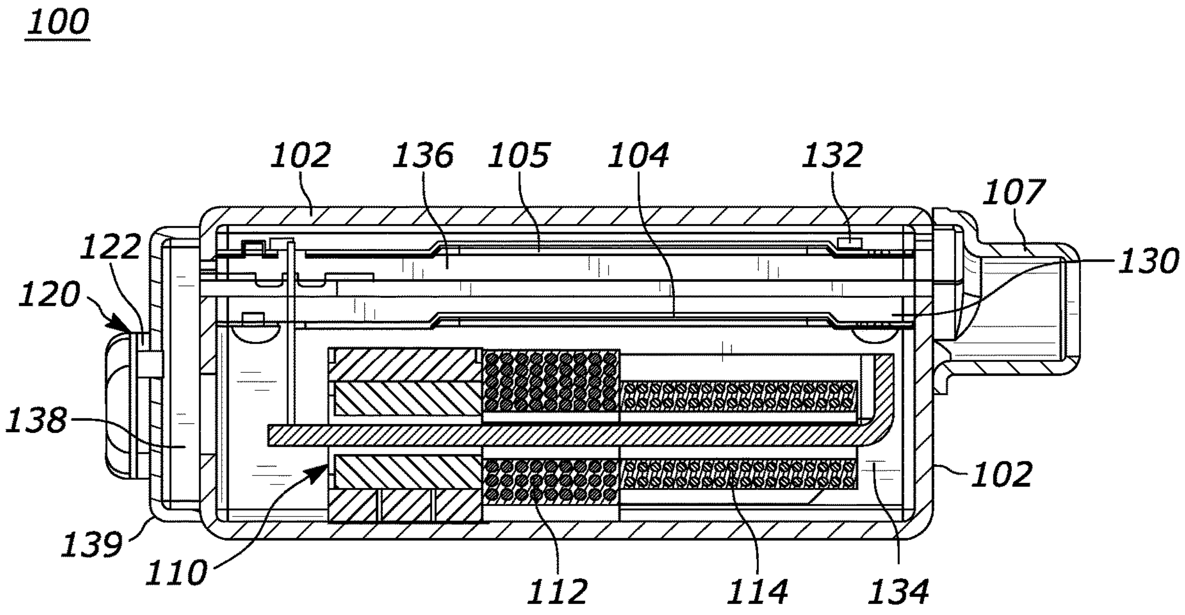
FIG. 7 is a sectional view of a receiver according to another embodiment.
Figure 8:
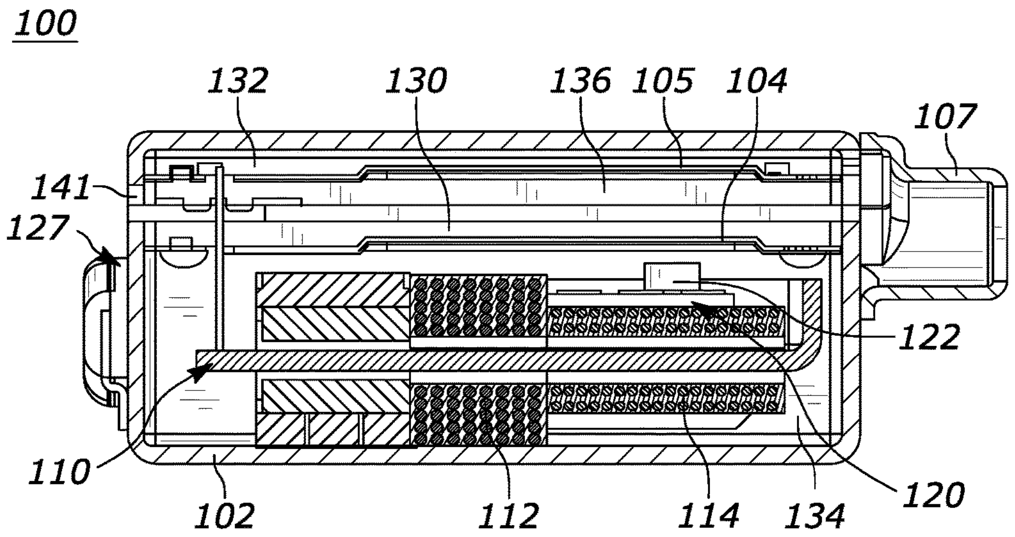
FIG. 8 is a sectional view of a receiver according to another embodiment.
Figure 9:
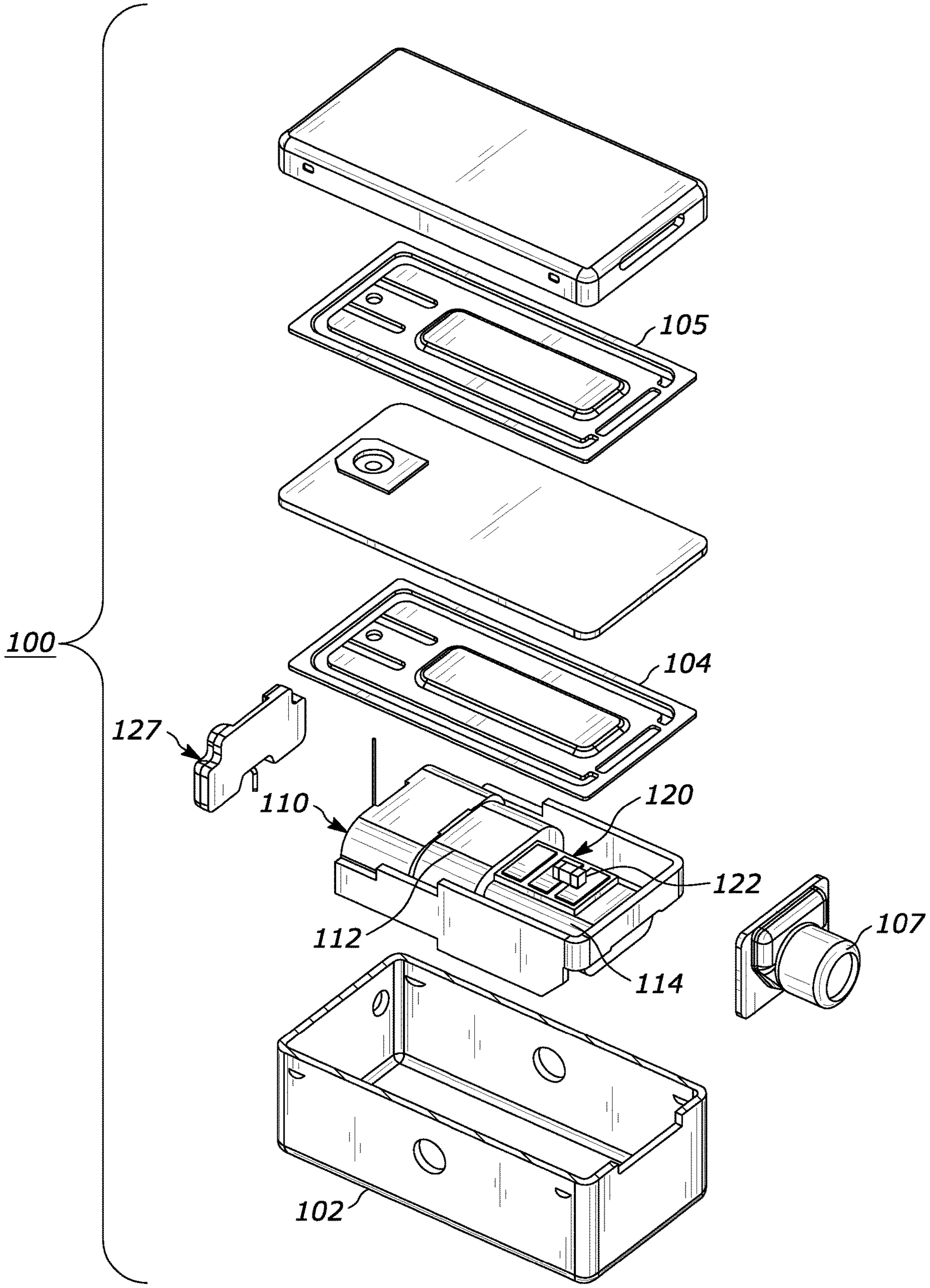
FIG. 9 is an exploded view of the receiver of FIG. 8.

In FIGS. 1-2, 4-9 and 12-14, a receiver 100 comprises multicoil motor 110 having a first coil 112 and a second coil 114 disposed in a housing 102 and electrically connected to contacts of a terminal board 120. A capacitor component 122 is integrated with the terminal board and electrically connected between contacts thereof as described further herein. The capacitor component can be integrated with the terminal board by surface mounting the capacitor component to contacts on the terminal board. Alternatively, the capacitor component can be embedded in, or otherwise fastened to, the terminal board. In FIGS. 4-9, the receiver comprises a first diaphragm 104 separating an interior of the receiver housing into back volume and a front volume acoustically connected to a sound port 106 of the housing 102, as shown best in FIG. 5. A sound port refers to a passage from the interior of the housing to the exterior thereof. In FIG. 4, the multicoil motor 110 comprises an armature 164 having a movable portion connected to the first diaphragm 104. In FIGS. 7-9, the receiver comprises a second diaphragm 105 separating an interior of the receiver housing into at least a second back volume and a second front volume as described further herein. Optionally, the sound port can be acoustically coupled to a nozzle 107 connected to the receiver housing.

In FIGS. 11-14, the multicoil receiver 100 is part of a RIC hearing device component 200 described more fully herein. In other implementations, one or more multicoil receivers can be integrated in some other body-worn hearing device, examples of which are described herein.

Figure 1:
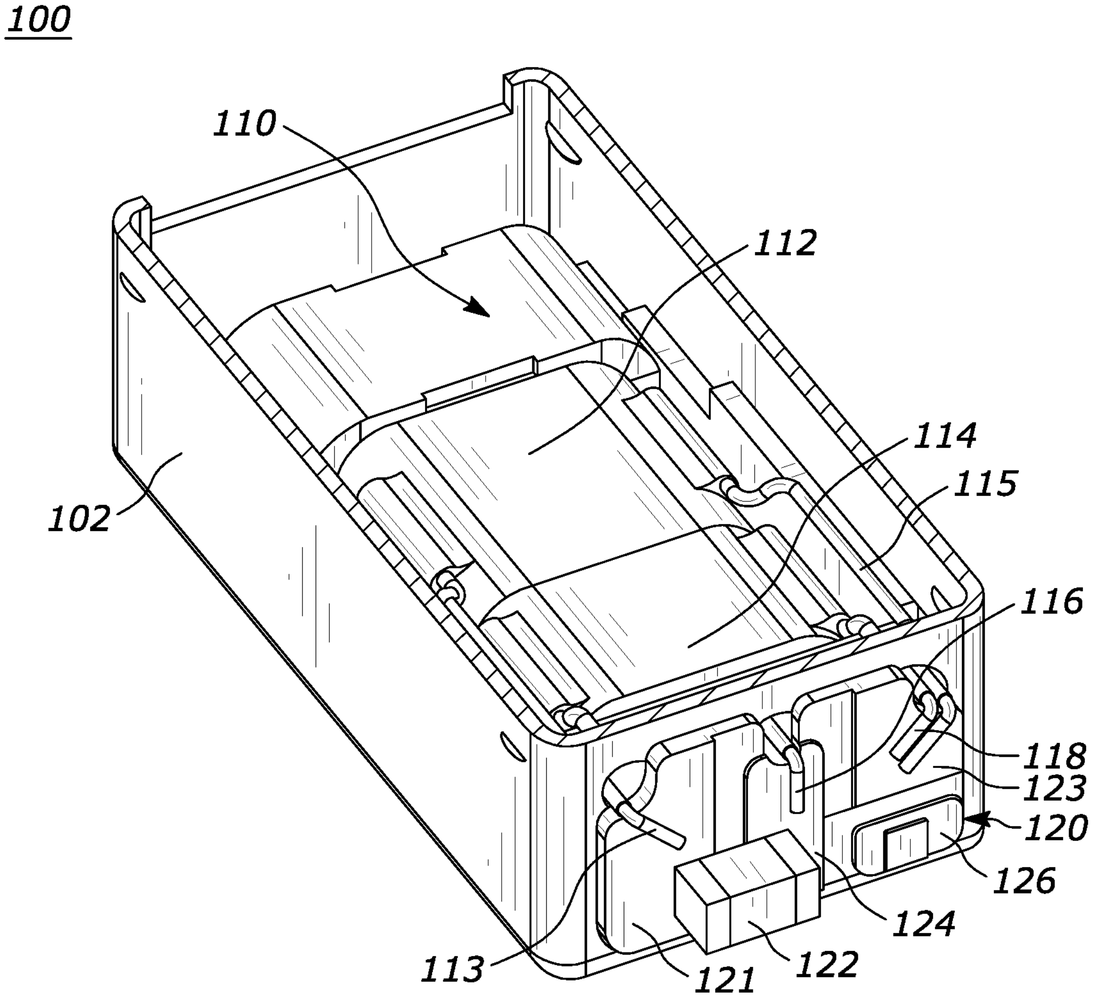
FIG. 1 is a partial isometric view of a receiver according to one embodiment.
Figure 2:
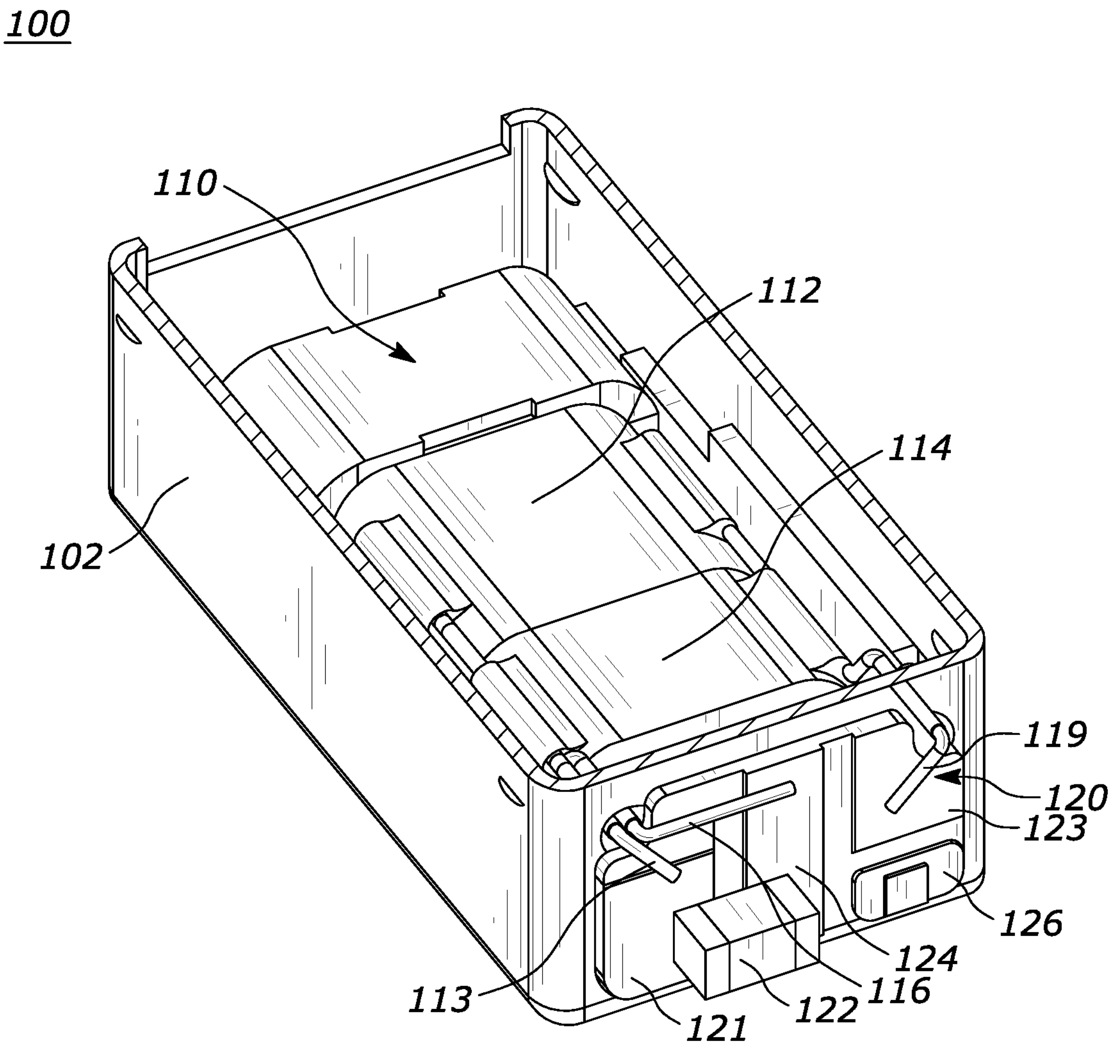
FIG. 2 is a partial isometric view of a receiver according to another embodiment.
Figure 3:
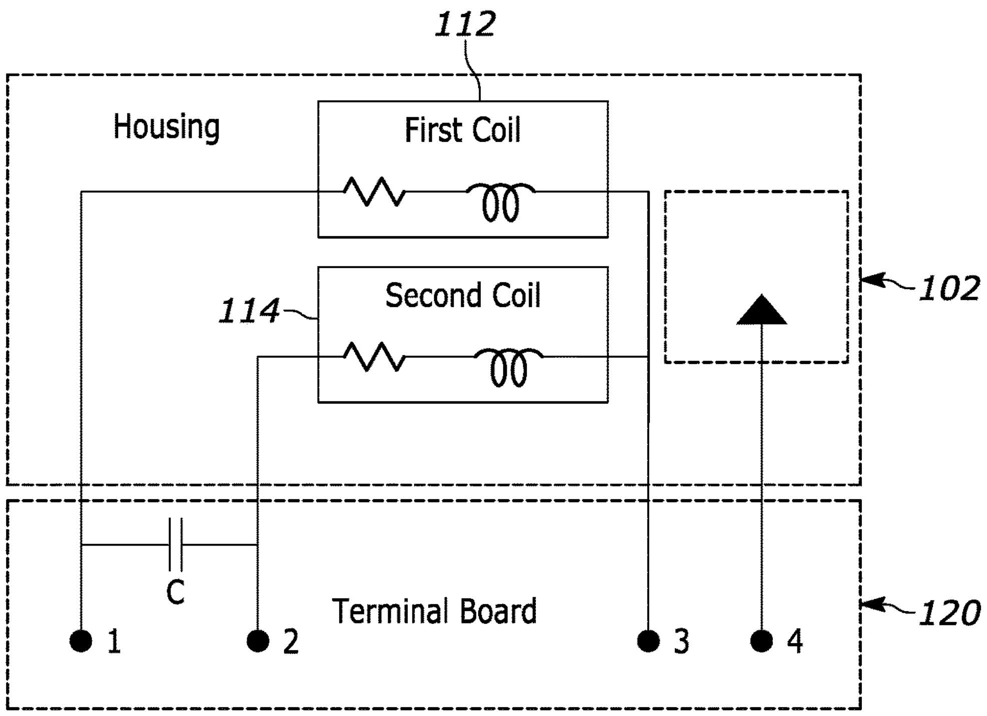
FIG. 3 is a schematic representation of a circuit diagram and terminal board assembly in a receiver.

Generally, the terminal board can be configured to connect the capacitor component in parallel or in series with one of the coils of the multicoil motor, depending on whether the coils are arranged in parallel or in series. In FIG. 3, the first coil 112 is electrically connected between contacts 1 and 3 of the terminal board 120, and capacitor C is electrically connected between contacts 1 and 2 of the terminal board and in series with the second coil 114 electrically connected between contacts 2 and 3 of the terminal board. In FIGS. 1-2, the terminal board 120 comprises at least three contacts accessible from an exterior of the receiver housing 102. Contacts accessible from an exterior of the housing can be located on an electrical interface accessible from an exterior of the housing. The first coil 112 is electrically connected between a first contact 121 and a third contact 123 of the terminal board. The capacitor component 122 is electrically connected between the first contact 121 and a second contact 124 of the terminal board, and the second coil 114 is electrically connected between the second and third contacts 124 and 123, respectively. The capacitor component 122 is also located on an electrical interface of the terminal board accessible from the exterior of the receiver housing. A terminal board accessible from the exterior of the housing comprises at least a portion that is exposed to an exterior of the housing. Alternatively, the terminal board can connect the first and second coils in series and connect the capacitor component in parallel with the first or second coil. Either configuration of the multicoil motor and capacitor component reduces the possibility of inadvertent reboot of hearing device operating systems and offsets increasing impedance that would otherwise occur with increasing frequency in the absence of the capacitor component.

Some hearing devices comprise an optional ground or other electrical reference. In some implementations, the terminal board comprises a ground contact electrically connected to a conductive portion of the housing or to some other electrical reference. The receiver housing can be conductive or the housing can be non-conductive and comprise a conductive portion connected to the ground contact on the terminal board. In FIG. 3, a fourth contact of the terminal board is electrically connected to a conductive portion of the housing 102. In FIGS. 1-2, the terminal board 120 comprises an electrical interface having a ground contact 126 accessible from an exterior of the housing and electrically connected to a conductive portion of the housing. The ground contact can be electrically connected to the conductive receiver housing by a solder joint or other electrical connection and can be electrically connected to an electrical ground of a hearing device operating system. Other hearing devices do not use or require a ground contact.

In some implementations, the ground contact on an external electrical interface of the terminal board accessible from an exterior of the housing is electrically connected to a conductive ground ring on an internal electrical interface of the terminal board facing the receiver housing. The conductive ring is electrically and mechanically connected to a conductive portion of the housing. For example, the terminal board can be soldered to a conductive housing or to a conductive portion of a non-conductive receiver housing. In FIGS. 5, 15, 18 and 20, the terminal board 120 comprises a ground ring 129 on a side of the terminal board facing the receiver housing 102. In some implementations, the terminal board acoustically seals a back volume of the receiver housing. In other implementations, the back volume of the receiver housing is vented to an exterior of the housing to affect a frequency response of the receiver.

In FIGS. 1-2, the terminal board 120 is fastened to an exterior of the housing 102 and comprises an electrical interface accessible from the exterior of the housing. Lead wires of the first and second coils are routed through one or more apertures or openings through the housing to contacts on the terminal board. The term "lead wire" used herein refers to end portions of the coil windings per se or to conductive extensions connected to end portions of the coil windings. In addition to any electrical couplings, lead wires from either coil may be further mechanically coupled or strain-relieved to one or both coils using adhesives or other mechanical coupling. In FIG. 1, a first lead wire 113 of the first coil 112 is routed through a first opening of the receiver housing to the first contact 121. A first lead wire of the second coil is routed through a second opening of the housing to the second contact 124. Second lead wires 115, 118 of the first and second coils, respectively are routed through a third opening to the third contact 123 of the terminal board. In FIG. 2, the first lead wires 113, 116 of the first and second coils are routed through a first opening in the housing and to the first and second contacts 121, 124, respectively, of the terminal board. The second lead wires of the first and second coils can be conjoined within the housing to a common lead wire 119 that is routed through a second aperture to the third contact 123 of the terminal board. Alternatively, all of the lead wires from the multicoil motor can be routed through a single aperture in the housing, or each lead wire can be routed through a corresponding aperture.

In some implementations, the lead wires of the first and second coils have different identifying characteristics to facilitate proper routing of the coil lead wires to contacts on the terminal board during manufacture or assembly. The wires can have different colors, different markings, different textures, or different sizes among other differences, and combinations thereof to facilitate identification and proper routing of the wires to the correct contacts of the terminal board. These and other coil lead wire perceptual characteristics can be implemented in any of the representative multicoil receivers described herein.

Figure 21:
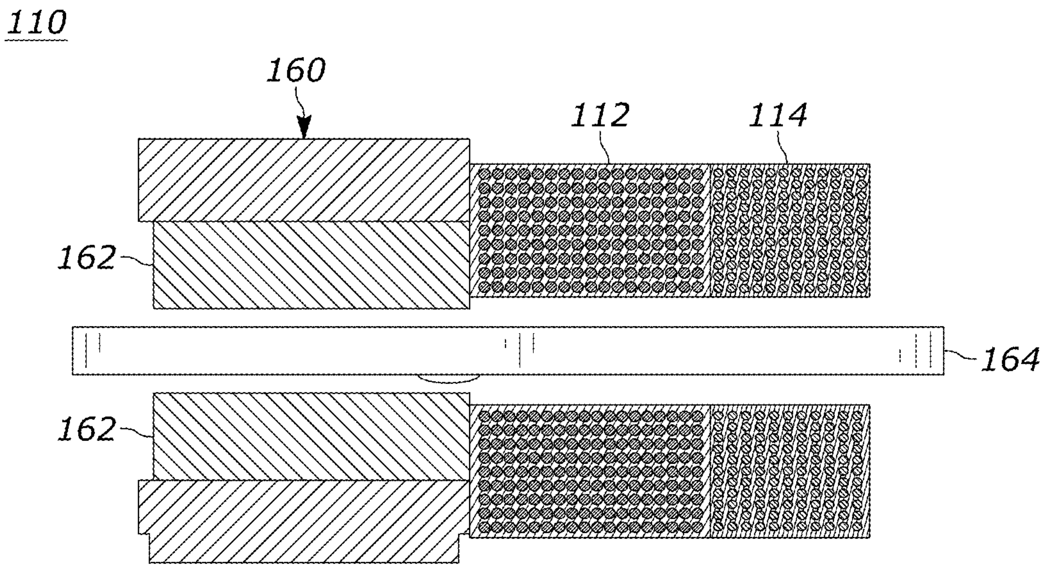
FIG. 21 is a partial sectional view of a multicoil motor according to one embodiment.
Figure 22:
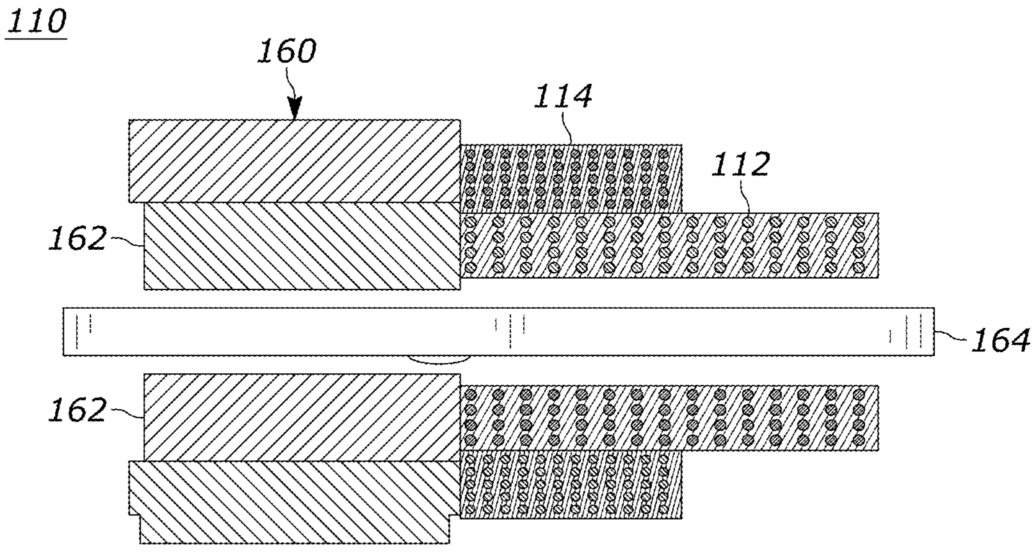
FIG. 22 is a partial sectional view of a multicoil motor according to another embodiment.
Figure 23:
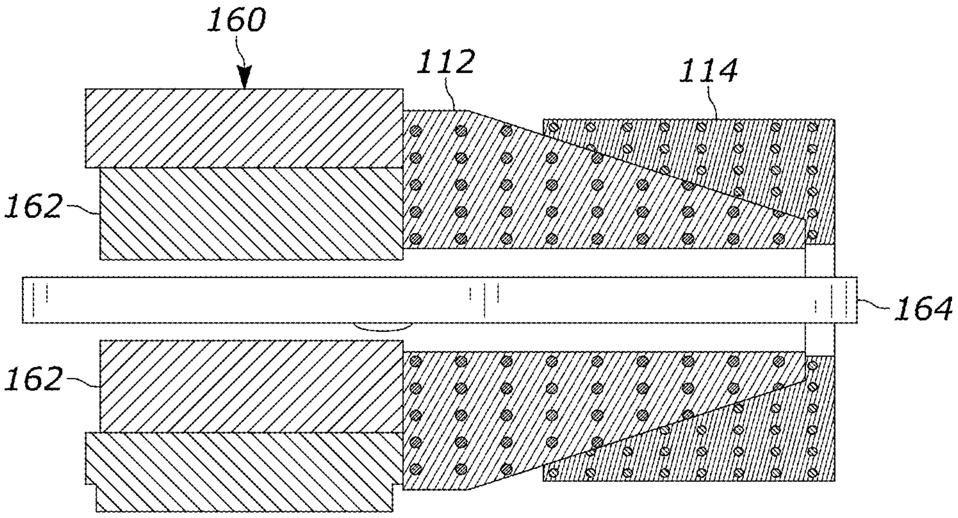
FIG. 23 is a partial sectional view of a multicoil motor according to yet another embodiment.
Figure 24:
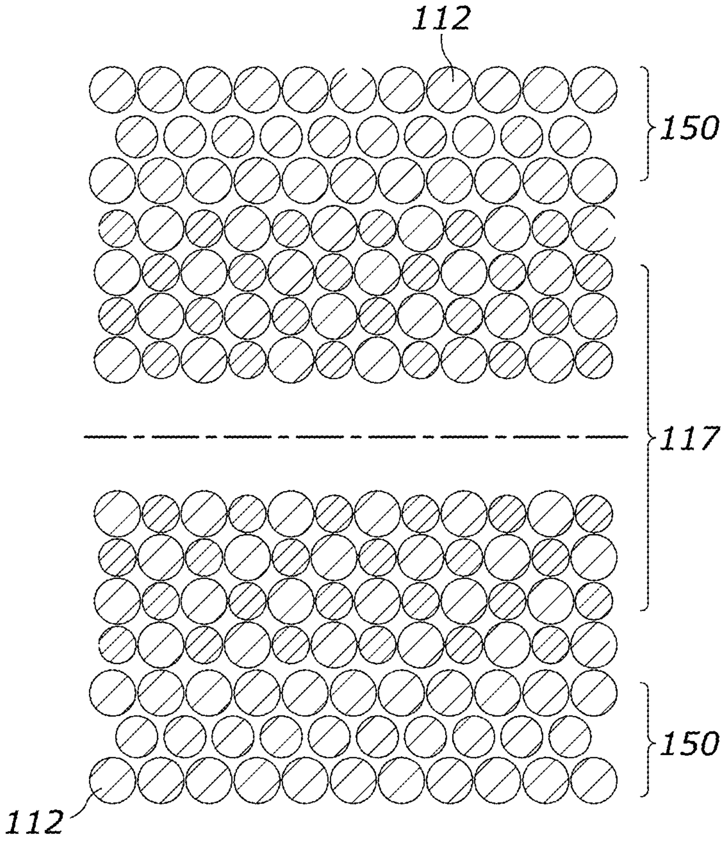
FIG. 24 is a partial sectional view of a multicoil winding according to still another embodiment.

Generally, either the first coil, second coil or both coils can be adjacent the motor yoke. In FIGS. 21-23, the receiver motor 110 comprises a yoke 160 retaining permanent magnets 162, between which a movable portion of the armature 164 extends. The representative motors do not include bobbins supporting the coils. But in other implementations the coils can be wound about or otherwise supported by a bobbin. Coils generally comprise an electrically conductive wire surrounded by an insulating enamel. The wire is generally bonded with some means to keep it in the form of a wound coil. Various methods can be used to bond the coil wires, including wet winding the coil in an epoxy or using thermally bonded adhesive type. In FIG. 21, the first coil 112 is located between the yoke and the second coil 114. In FIG. 22, the second coil 114 is located at least partially about the first coil 112, wherein an outer periphery of the first coil is smaller than an inner periphery of the second coil. Both of the first and second coils are adjacent the yoke 160. Alternatively, the second coil 114 can be spaced apart from the yoke. In FIG. 23, the first coil 112 comprises a tapered shape having a larger outer peripheral portion adjacent the yoke 160. The second coil 114 is located at least partially about the first coil and comprises a complementary tapered shape having a larger inner periphery located closer to the yoke than a smaller inner periphery farther from the yoke. In some implementations, the first and second coils are at least partially interwound. In FIG. 24, the first coil 112 comprises a first portion 117 interwound together with the second coil. The first coil has more turns than the second coil, wherein a second portion 150 of the first coil is wound about the interwound portions of the first and second coils. Anyone of the various coil winding implementations described herein, among others, can be implemented in all of the representative receivers and representative hearing device components described herein.

In some implementations, the multicoil receiver comprises multiple diaphragms separating the interior of the housing into multiple back volumes and one or more front volumes. In FIGS. 7-9, the receiver comprises a first diaphragm 104 separating the interior of the housing into a first front volume 130 and a first back volume 134, and a second diaphragm 105 separating the interior of the housing into second front volume 132 and a second back volume 136. In FIGS. 7-8, one or more sound ports of the housing acoustically couple the first and second front volumes to a nozzle 107. In FIG. 7, the first and second back volumes are acoustically coupled to each other via a chamber 138 defined by a cup 139 or other portion of the housing 102. In FIG. 8, the second back volume 136 is acoustically connected to an exterior of the housing 102 by a vent 141. In other implementations, a shared front volume can be located between the first and second diaphragms. Alternatively, a shared motor can be located between the first and second diaphragms and the first volumes can be located on opposite side of the housing interior. In other implementations, each diaphragm can be driven by a separate corresponding motor. These and other multi-diaphragm configurations, among others, can be implemented in any of the representative multicoil receivers described herein.

In some implementations, the multicoil receiver comprises a capacitor component integrated with and electrically connected to contacts of an electrical interface accessible from an exterior of the receiver housing. In FIGS. 1-2 and 4-5, the electrical interface is located on a terminal board 120 fastened to an exterior of the receiver housing 102. In FIGS. 1-2, the capacitor component 122 and lead wires from the first and second coils 112 and 114 are electrically connected to contacts of an external electrical interface accessible from the exterior of the receiver housing 102. In FIGS. 4-5, the capacitor component 122 and lead wires from the first and second coils 112 and 114 are electrically connected to contacts of an internal electrical interface located in the interior of the receiver housing.

Alternatively, the terminal board can be fastened to an interior of the housing and the external electrical interface of the terminal board can be accessible from the exterior of the housing via an opening of the housing. In FIG. 5 for example, the terminal board 120 can be alternatively fastened to the interior of the housing, instead of to the exterior of the housing as shown in FIG. 4. The capacitor component and the electrical lead wires can be fastened to an internal electrical interface 170 within the housing. Alternatively, the first and second coil lead wires can be electrically connected to contacts on the internal electrical interface and the capacitor component can be electrically connected to contacts on the external electrical interface.

In other implementations, the multicoil receiver comprises a capacitor component integrated with and electrically connected to contacts of a first (internal) electrical interface located in an interior of the receiver housing. The internal electrical interface is electrically connected to a second (external) electrical interface accessible from an exterior of the receiver housing for connection to a drive signal source. The first and second electrical interfaces can be on a common terminal board or on different terminal boards. The lead wires of the first and second coils can be electrically connected to contacts of the first or second electrical interface. The electrical connections of the first and second coils and capacitor component at the terminal board are configured to modify an electrical impedance of the receiver, in response to an electrical signal, compared to an electrical impedance of the receiver in the absence of the capacitor component as described herein.

Figure 10:
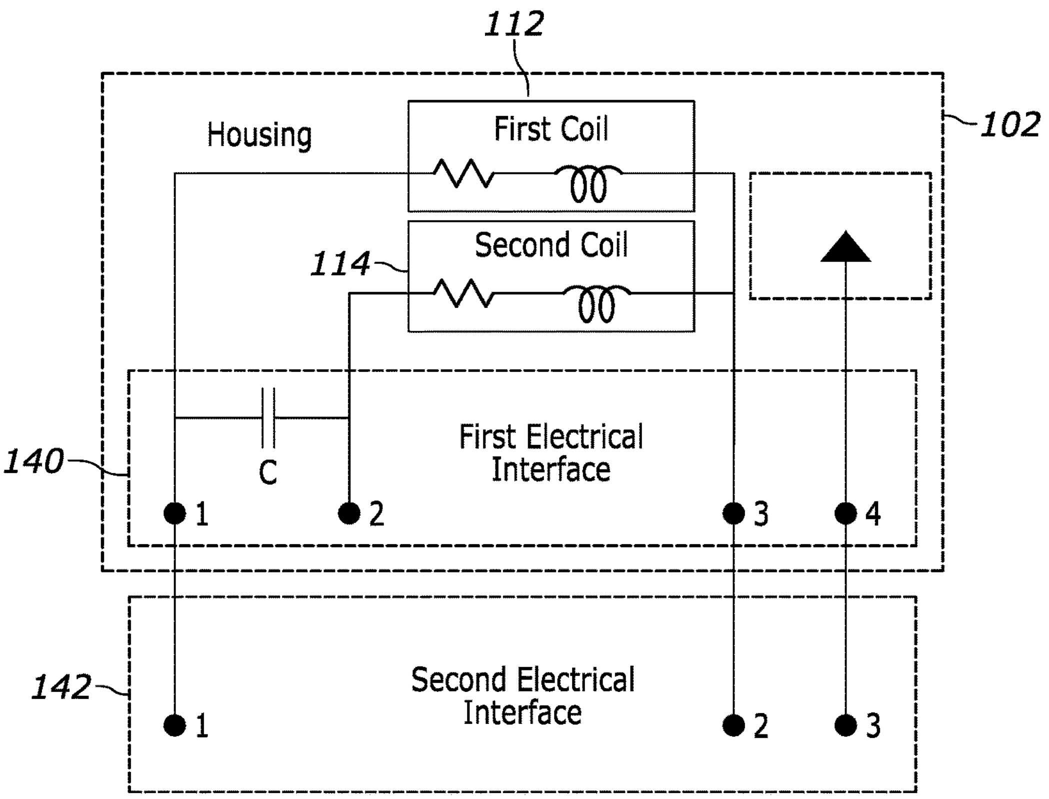
FIG. 10 is another schematic representation of a circuit diagram and terminal board assembly in a receiver.

In FIG. 10, a first electrical interface 140 electrically connects a first coil 112 in parallel with a second coil 114 electrically connected in series with a capacitor component C as described herein. The first electrical interface 140 comprises a first contact 1 electrically connected to a first contact 1 of a second electrical interface 142. The first electrical interface also comprises a third electrical contact 3 electrically connected to a second electrical contact 2 of the second electrical interface. Optionally, the first electrical interface can also comprise a ground contact 4 electrically connected to a ground portion of the receiver housing, and the second electrical interface 142 can comprise a ground contact 3 electrically connected to the ground contact 4 of the first electrical interface. Alternatively, a ground contact of the second interface may connect directly to a ground portion of the receiver housing. Alternatively, the first electrical interface can connect the first and second coils in series, wherein one of the first or second coils is electrically connected in parallel with the capacitor component C as described herein.

In some implementations, the first and second electrical interfaces are located on different portions of a common terminal board. For example, the first and second interfaces can be on two different layers on opposite side of a multilayer printed circuit board or flex harness, and electrical connections between the first and second interfaces can be established using traces internal to the printed circuit board or flex harness. In FIGS. 4-5 and 7, the terminal board 120 covers an opening 101 (shown best in FIG. 5) of the receiver housing 102 and the first and second electrical coils 112 and 114 and the capacitor component 122 are electrically connected to contacts on a first electrical interface located in an interior of the housing. Contacts of a second electrical interface are electrically connected to contacts of the first electrical interface. The contacts of the second electrical interface are accessible from an exterior of the housing for connecting to an electrical drive signal source. Alternatively, the capacitor component 122 of FIGS. 4-5 and 7 can be integrated with the external electrical interface and the first and second coils can be electrically connected to contacts of the internal electrical interface.

In other implementations, the first and second electrical interfaces are located on different terminal boards. In FIG. 6, a terminal board 120 located in the back volume of the receiver housing 102 comprises a first electrical interface on which the capacitor component 122 is integrated. The first and second coils 112 and 114 are electrically connected to the first electrical interface of the terminal board 120. The first electrical interface is electrically connected to a second electrical interface of a second terminal board 127 fastened to an exterior of the housing 102. Contacts of the second electrical interface 127 are accessible from an exterior of the receiver housing 102 for connecting to an electrical drive signal source.

In FIGS. 8-9, the capacitor component 122 is integrated with a first electrical interface of a first terminal board 120 fastened to the second coil 114, wherein the terminal board 120 is located within the housing 102 of a receiver comprising multiple diaphragms. Alternatively, the first terminal board 120 can be fastened to the first coil 112 or to both coils. The first and second coils are electrically connected to the first electrical interface as described herein. Contacts of the first electrical interface are electrically connected to contacts of a second electrical interface of a second terminal board 127, wherein contacts of the second electrical interface are accessible from an exterior of the housing. In other implementations, the terminal board 120 can be fastened to one of the coils in a multicoil receiver comprising a single diaphragm.

Figure 11:
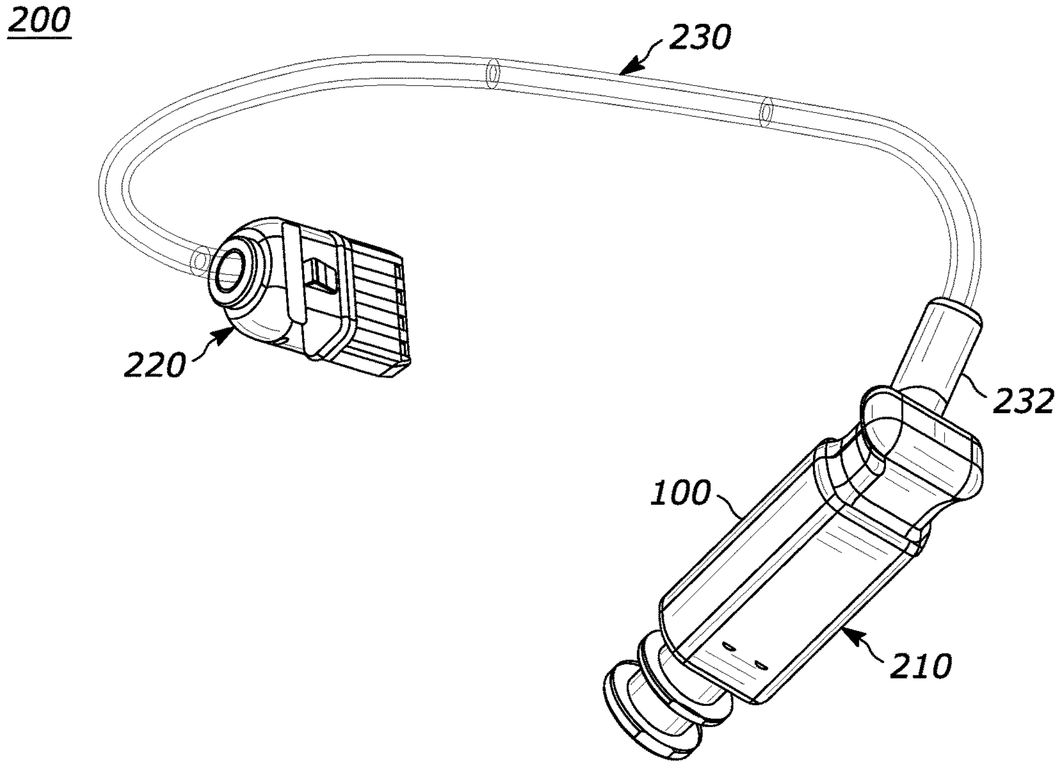
FIG. 11 is a receiver-in-canal (RIC) hearing device component.

In FIG. 11, the hearing device is a receiver-in-canal (RIC) component 200 comprising a RIC unit 210 connected to a behind-the-car (BTE) connector 220 by an electrical cable assembly 230. The BTE connector is connectable to a BTE unit (not shown) configured to be worn on a backside of a user's car. The BTE unit comprises electrical components including an audio processor that generates an electrical audio signal based on signals from one or more microphones for transmission to the RIC unit via the electrical cable assembly. The BTE unit also comprises batteries and can comprise a wireless receiver for communication with a host device, like a smart phone, or another BTE unit worn on the user's other ear.

Figure 12:
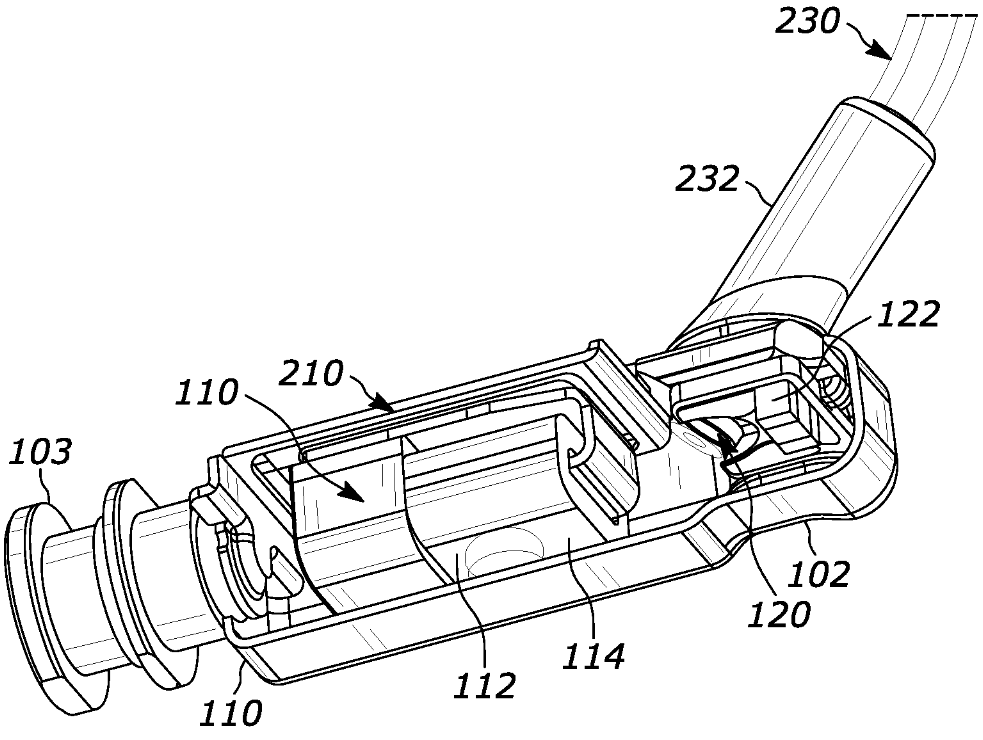
FIG. 12 is a partial sectional view of the RIC component of FIG. 11.
Figure 13:
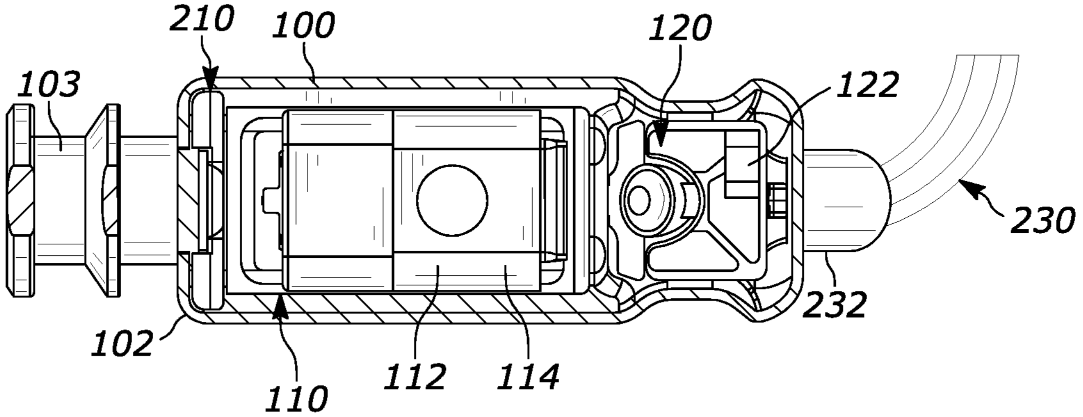
FIG. 13 is a different partial sectional view of the RIC component of FIG. 11.
Figure 14:
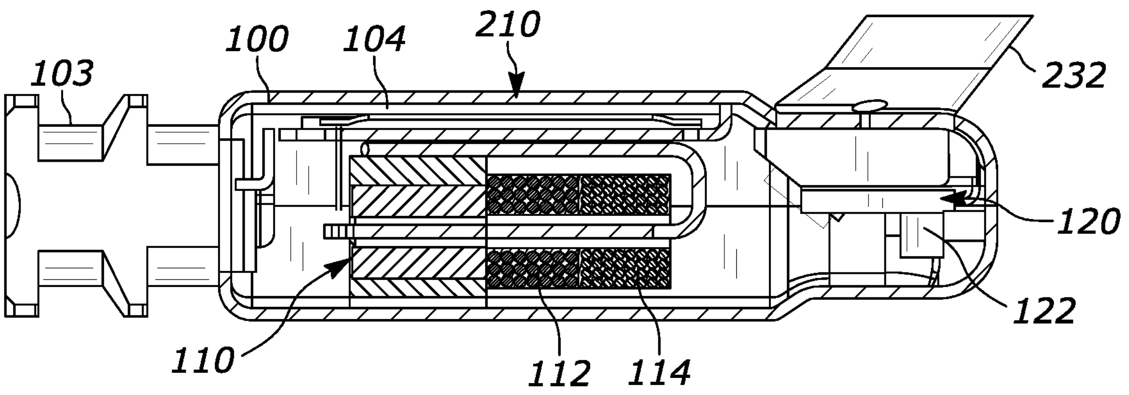
FIG. 14 is another partial sectional view of the RIC component of FIG. 11.

In FIGS. 12-14, the RIC unit is configured for wear at least partially in a user's ear canal and comprises a speaker or receiver 100 that generates an acoustic signal in response to an electrical signal provided by the BTE unit. In some implementations, the speaker is acoustically coupled to a sound passage through a nozzle 103 that supports a resilient car-dome (not shown) configured to fit at least partially in the user's car canal. The receiver 100 generally comprises a diaphragm that separates an interior of a receiver housing 102 into a back volume and a front volume acoustically coupled to a sound port as described herein. In FIG. 14, the diaphragm 104 comprises an s-shaped frame but other implementations can comprise a planar frame. A multicoil motor 110 located in the receiver housing is connected to the diaphragm and comprises an armature having a portion movably located between permanent magnets of a yoke as described herein.

The speaker or receiver also comprises a terminal board 120 having an electrical interface located in an interior of the housing 102. First and second coils 112 and 114 of the multicoil motor are electrically connected to contacts of the electrical interface. A capacitor component 122 is integrated with the terminal board and electrically connected to contacts of the electrical interface. The electrical connections of the capacitor component and the first and second coils at the electrical interface are configured to modify an electrical impedance of the receiver, in response to an electrical signal, compared to an electrical impedance of the receiver in the absence of the capacitor component.

In FIGS. 12-14, the receiver housing 102 constitutes an exterior of the RIC unit 210. The nozzle 103 is shown integrated directly with the receiver housing 102. Thus configured, the RIC unit is devoid of any structure encapsulating the exterior of the housing, reducing the overall size of the RIC unit. In FIGS. 12-14, the motor 110 is directly coupled to an interior of the housing 102 without intervening structure, further reducing the overall size of the RIC unit. In other implementations, the receiver can be encapsulated in an outer housing (not shown) and the nozzle can be integrally formed with the outer housing and acoustically coupled to the sound port of the receiver.

Generally, an end of the electrical cable assembly is connected to a housing of the RIC unit. In FIGS. 12-14, the electrical cable assembly 230 comprises a first end portion 232 connected directly to the receiver housing 102, which constitutes the exterior of the RIC unit. In other implementations, the first end portions of the electrical cable assembly can be connected to an outer housing encapsulating the receiver. In FIGS. 12-14, the terminal board 120 is integrated with the end portion 232 of the electrical cable assembly and located within the receiver housing. In RIC unit implementations that comprise an external housing encapsulating the receiver, the end portion of the cable assembly can be integrated with the external housing. In other implementations, the terminal board can be located elsewhere in the receiver or external housing. Also, the terminal board does not necessarily need to be integrated with the electrical cable assembly. For example, the terminal board can be located in the back volume as shown in FIGS. 4-6 or fastened to a coil of the receiver as shown in FIGS. 8-9, among other locations.

In some implementations, a sound-producing transducer assembly for an car-worn hearing device comprises two or more receivers mechanically connected (also referred to as "ganged"). The ganged receivers can be connected by an adhesive, weld, external housing, strap, tape or some other retention mechanism. In FIGS. 15-20, a first receiver 302 is connected to a second receiver 304. Each of the ganged receivers comprises one or more diaphragms separating an interior of the receiver housing into one or more front and back volumes as described herein. Each receiver also comprises a motor located in the housing and comprising an armature with a movable portion located between magnets retained by a yoke. The movable portion of the armature is connected to the one or more diaphragms. These and other aspects of receivers are described more fully herein in connection with FIGS. 1-2 and 4-9. The ganged receivers can also be electrically connected to each other in parallel or in series as described further herein.

Figure 15:
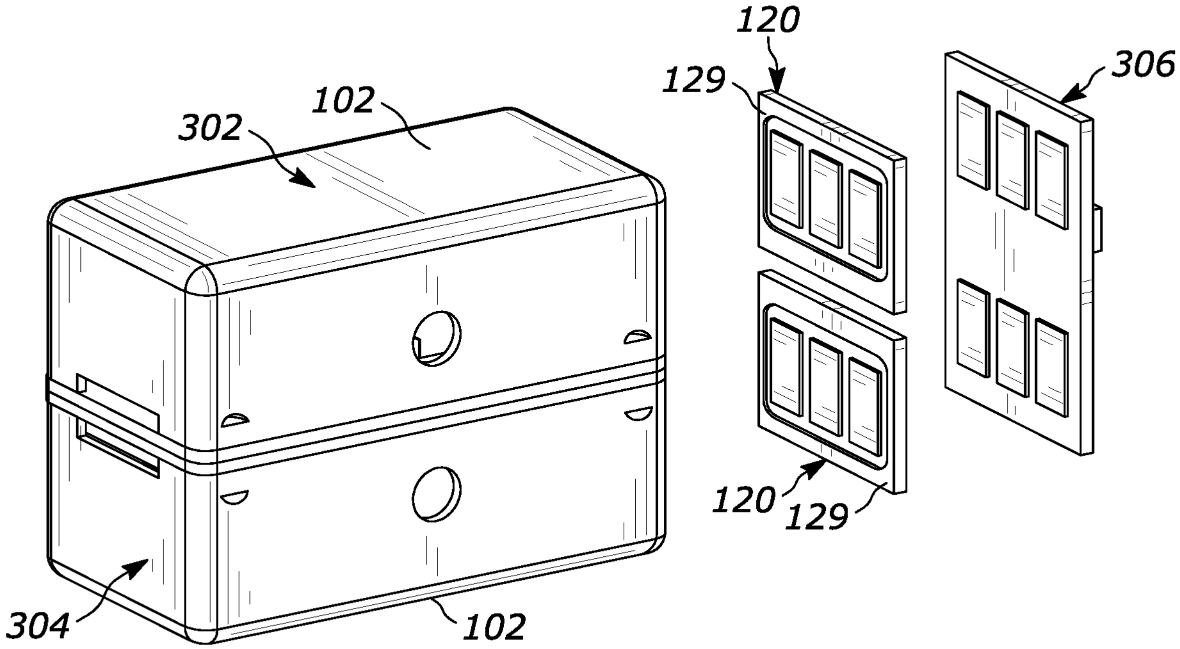
FIG. 15 is a partial exploded view of ganged receivers.
Figure 17:
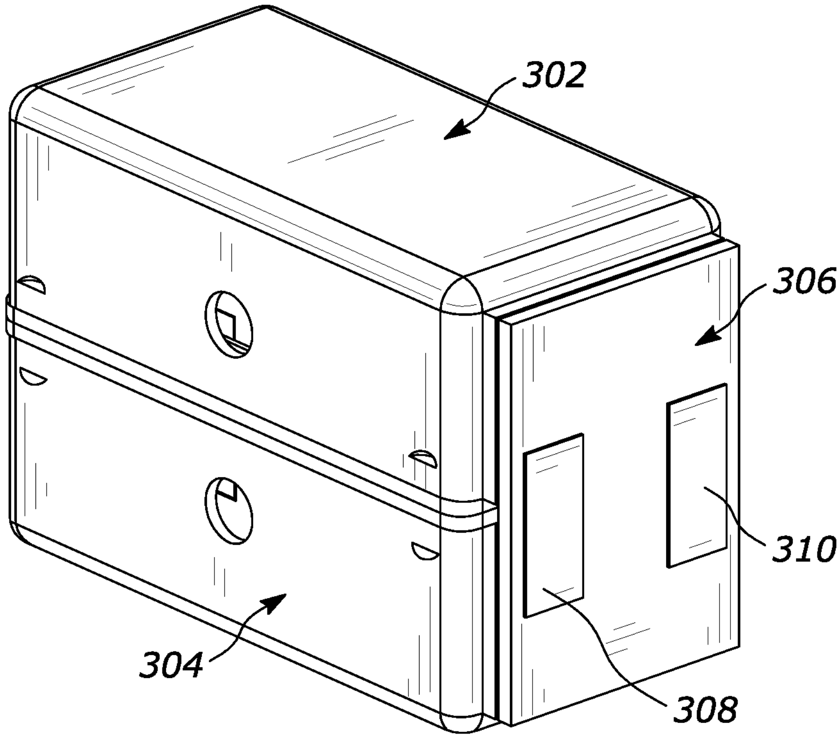
FIG. 17 is an isometric view of ganged receivers according to another embodiment.
Figure 18:
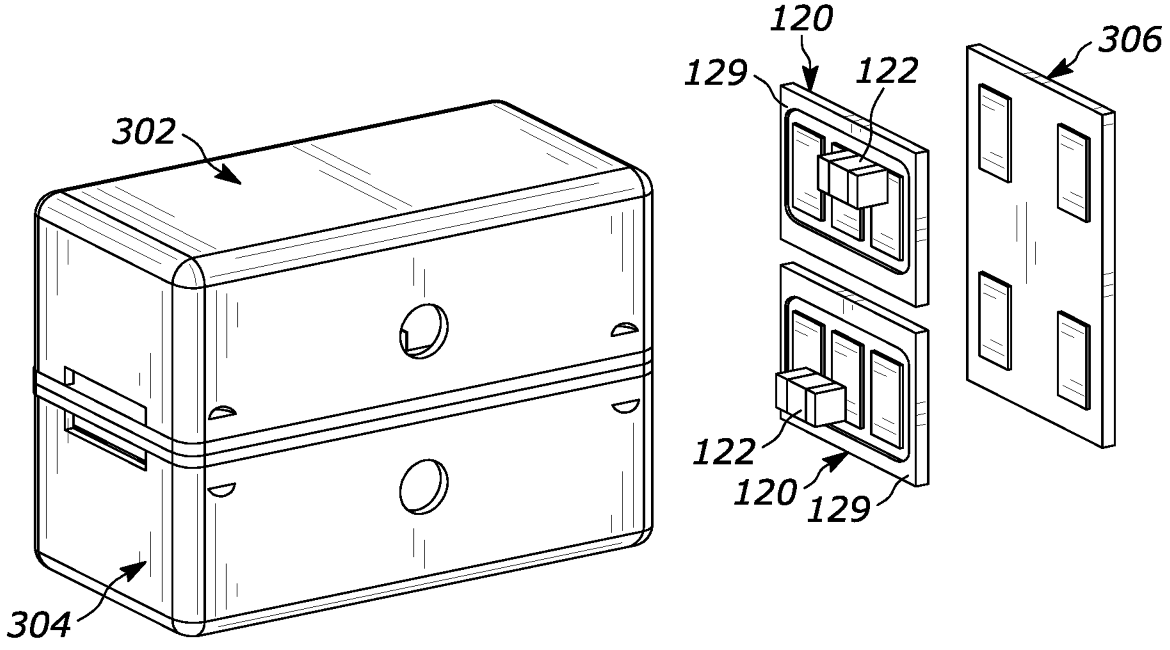
FIG. 18 is an exploded view of the ganged receivers of FIG. 17.
Figure 19:
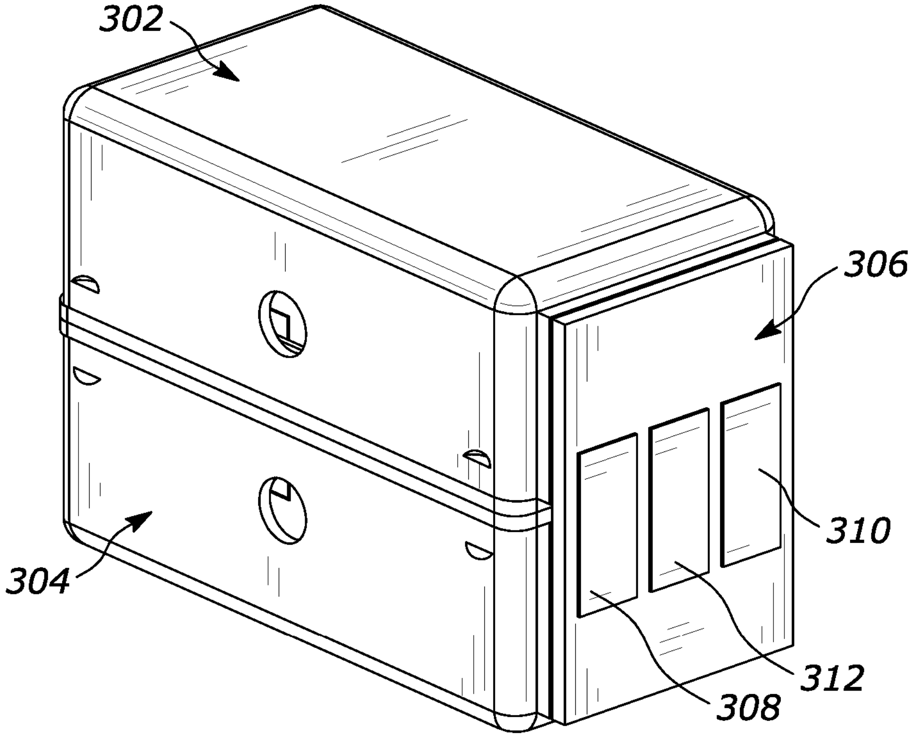
FIG. 19 is an isometric view of ganged receivers according to yet another embodiment.
Figure 20:
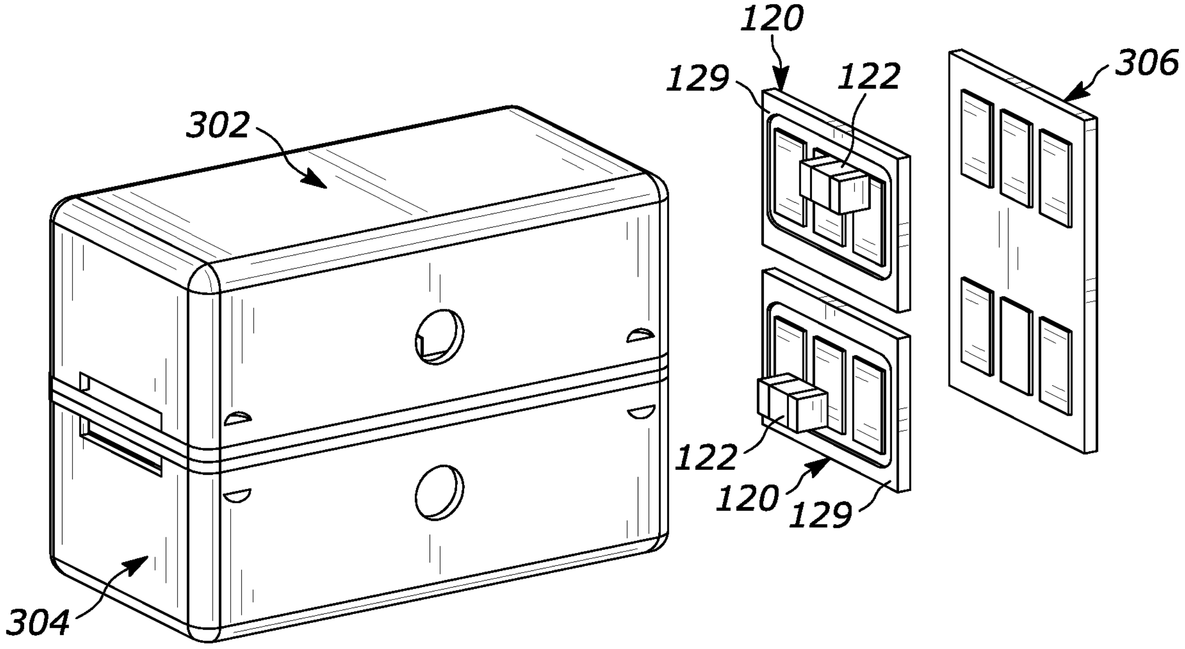
FIG. 20 is an exploded view of the ganged receivers of FIG. 19.

Each of the ganged receivers also comprises a corresponding terminal board 120 comprising an external electrical interface accessible from an exterior of the receiver, as shown in FIGS. 15, 18 and 20. The terminal board of each receiver also comprises an internal electrical interface located at least partially in an interior of the receiver housing. Contacts of the internal electrical interface are electrically connected to contacts of the external electrical interface, examples of which are described in connection with FIGS. 3 and 10 and alternative configurations described herein. The one or more coils of each receiver can be electrically connected to contacts of the corresponding internal electrical interface. At least one of the ganged receivers comprises a multicoil motor (not shown in FIGS. 15-20) electrically connected to contacts of a terminal board as shown and described in connection with FIGS. 1-2 and 4-9. In receivers comprising multiple coils, a capacitor component 122 can be integrated with, and electrically connected to contacts of, the internal electrical interface of the terminal board 120 as shown in FIGS. 18 and 20. In some implementations, the internal electrical interface comprises a ground contact 129 connectable to a conductive portion of the receiver housing, as shown in FIGS. 15, 18, 20 and 22. The ground contact can be electrically connected to a corresponding contact of the external electrical interface of the corresponding terminal board 120.

In FIGS. 15-20, a third terminal board 306 comprises an internal electrical interface having contacts electrically connected to contacts of an external electrical interface of terminals 120 accessible from an exterior of ganged receivers 302 and 304. In one implementation, the third terminal board 306 is a planar member and the external electrical interfaces of the ganged receivers 302 and 304 are located in a common plane. In other implementations, the third terminal board 306 can be a flexible terminal board and the external electrical interfaces of the terminal boards 120 of the ganged receivers are not located in a common plane. In some implementations, the internal and external interfaces of the third terminal board are on two different layers of a multi-layer printed circuit board or flex harness, and the electrical connections between the first and second interfaces of the third terminal board are established using traces internal to the printed circuit board or flex harness. The electrical connections between contacts on the internal and external electrical interfaces of the third terminal board 306 can be configured to connect the ganged receivers 302 and 304 in parallel or in series.

Figure 16:
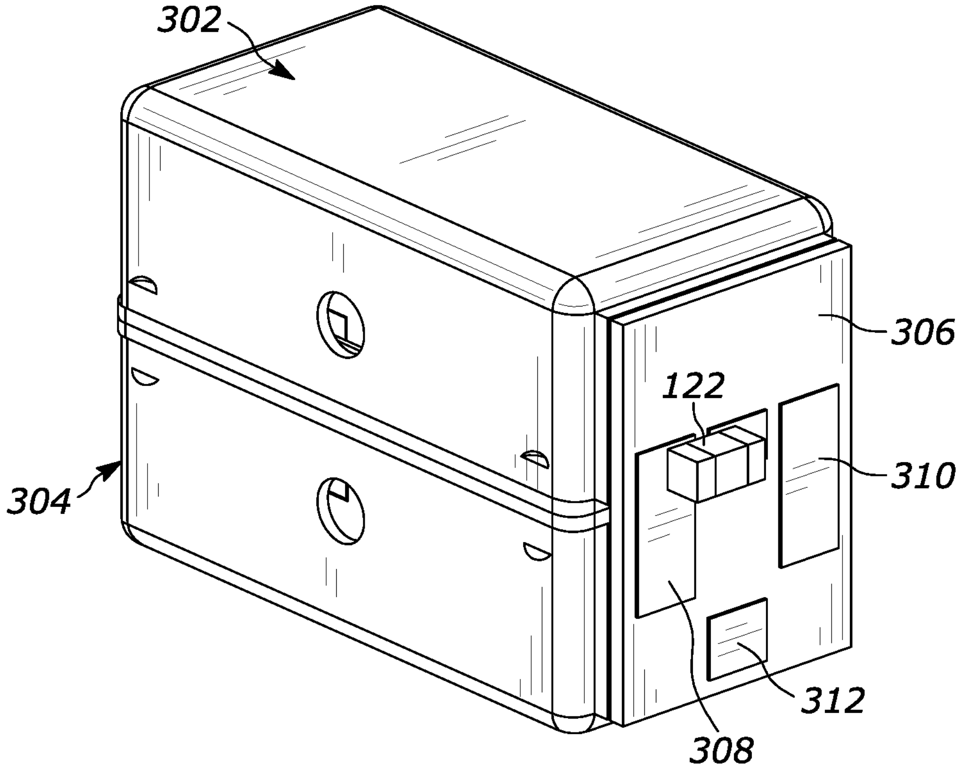
FIG. 16 is an isometric view of the ganged receivers of FIG. 15 fully assembled.

In FIGS. 15-16, the third terminal board 306 electrically connects ganged receivers 302 and 304 in parallel for receipt of an electrical audio signal via electrical drive signal contacts 308 and 310 of the external electrical interface. Each terminal board 120 comprises a ground contact 129 electrically connected to a conductive portion of the corresponding receiver housing 102 and to a common ground contact 312 on the third terminal board 306. Contacts of the internal electrical interface of each terminal board 120 are electrically connected to first and second coils of the corresponding receiver and to common contacts 308 and 310 of the third terminal board 306. A single capacitor component 122 is electrically connected to the external electrical interface of the third terminal board 306 to configure the receiver as described generally in connection with FIGS. 3 and 10 and the alternative embodiments described herein, among others. In one implementation, the single capacitor is in series with the second coil of both ganged receivers, wherein each of the second coils are in parallel with each other.

In FIG. 17, the third terminal board 306 can electrically connect ganged receivers 302 and 304 in parallel or in series for receipt of an electrical audio signal via electrical drive signal contacts 308 and 310 of the external electrical interface. In FIG. 19, the third terminal board 306 also comprises a ground contact 312 in addition to contacts 308 and 310 on the external electrical interface. One or both of the ganged receivers 302 and 304 of FIGS. 17 and 19 can comprise multicoil motors. In FIGS. 18 and 20, contacts of the internal electrical interface of the terminal board 120 of each receiver is electrically connected to first and second coils of the corresponding receiver and to common drive signal contacts 308 and 310 on the third terminal board 306. A capacitor component 122 is integrated with and electrically connected to the internal electrical interface of the terminal board 120 to configure the receiver as described generally in connection with FIGS. 3 and 10.

While the disclosure and what is presently considered to be the best mode thereof has been described in a manner establishing possession and enabling those of ordinary skill in the art to make and use the same, it will be understood and appreciated that there are many equivalents to the representative embodiments described herein and that myriad modifications and variations may be made thereto without departing from the scope and spirit of the invention, which is to be limited not by the embodiments described, but by the appended claims and their equivalents.

What is claimed is:

1. A receiver-in-canal (RIC) hearing device component comprising:

a balanced armature receiver comprising:

- a housing containing a diaphragm that separates an interior of the housing into a back volume and a front volume acoustically coupled to a sound port of the housing, the housing constitutes an exterior of the RIC hearing device component;
- a multicoil motor located in the housing and comprising an armature having a movable portion connected to the diaphragm;
- a terminal board comprising an electrical interface located within the housing, the multicoil motor electrically connected to contacts of the terminal board;
- a capacitor component integrated with the electrical interface and electrically connected to contacts of the electrical interface, electrical connections of the multicoil motor and the capacitor component to the electrical interface configured to change an electrical impedance of the balanced armature receiver based on a frequency of an electrical signal applied to the multicoil motor; and
- an electrical cable assembly comprising a first end portion connected to the housing and an electrical connector on a second end portion of the electrical cable assembly.

2. The RIC hearing device component of claim 1 is devoid of secondary housing structure encapsulating an exterior of the housing.

3. The RIC hearing device component of claim 2, wherein the multicoil motor is directly coupled to an interior of the housing without intervening structure.

4. The RIC hearing device component of claim 1, wherein the terminal board is integrated with the electrical cable assembly.

5. The RIC hearing device component of claim 1, the electrical interface comprising at least 3 contacts, a first coil of the multicoil motor electrically connected between a first contact and a third contact, the capacitor component electrically connected between the first contact and a second contact, and a second coil of the multicoil motor electrically connected between the second contact and the third contact.

6. The RIC hearing device component of claim 1, wherein the multicoil motor is directly coupled to an interior of the housing without intervening structure.

7. The RIC hearing device component of claim 1 further comprising a second diaphragm that separates the interior of the housing into a second front volume and a second back volume, the second front volume acoustically coupled to the sound port.

8. The RIC hearing device component of claim 1 further comprising a second diaphragm that separates the interior of the housing into a second back volume, and a cup coupled to the housing, wherein an interior of the cup acoustically couples the back volume to the second back volume.

9. The RIC hearing device component of claim 1, wherein a first coil of the multicoil motor is located between a yoke and a second coil.

10. The RIC hearing device component of claim 9, the first coil comprising a tapered outer surface with a larger outer peripheral portion adjacent the yoke and a smaller outer peripheral portion extending away from the yoke, the tapered outer surface of the first coil at least partially disposed in a tapered inner surface of a second coil of the multicoil motor.

11. The RIC hearing device component of claim 1, a first coil of the multicoil motor comprising a first portion interwound with at least a portion of a second coil of the multicoil motor, the first coil having more turns than the second coil, wherein a second portion of the first coil is wound about the first portion interwound with the second coil.

12. An ear-worn hearing device comprising:

a balanced armature receiver comprising:

a housing containing a diaphragm that separates an interior of the housing into a back volume and a front volume acoustically coupled to a sound port of the housing, the housing constitutes an exterior of the ear-worn hearing device;

a multicoil motor located in the housing and comprising an armature having a movable portion connected to the diaphragm;

a terminal board comprising an electrical interface located within the housing, the multicoil motor electrically connected to contacts of the terminal board;

a capacitor component integrated with the electrical interface and electrically connected to contacts of the electrical interface; and an electrical cable assembly comprising a first end portion connected to the housing and an electrical connector on a second end portion of the electrical cable assembly.

13. The ear-worn hearing device of claim 12 is devoid of secondary housing structure encapsulating an exterior of the housing.

14. The ear-worn hearing device of claim 13, wherein the multicoil motor is directly coupled to an interior of the housing without intervening structure.

15. The ear-worn hearing device of claim 13, wherein the terminal board is integrated with the electrical cable assembly.

16. The ear-worn hearing device of claim 12, the electrical interface comprising at least 3 contacts, a first coil of the multicoil motor electrically connected between a first contact and a third contact, the capacitor component electrically connected between the first contact and a second contact, and a second coil of the multicoil motor electrically connected between the second contact and the third contact.

17. The ear-worn hearing device of claim 12, the diaphragm comprising an S-shaped frame supporting a paddle connected to the armature.

18. The ear-worn hearing device of claim 12 further comprising a second diaphragm that separates the interior of the housing into a second back volume.

19. The ear-worn hearing device of claim 12, wherein a first coil of the multicoil motor is located between a yoke and a second coil.

20. The ear-worn hearing device of claim 19, the first coil comprising a tapered outer surface with a larger outer peripheral portion adjacent the yoke and a smaller outer peripheral portion extending away from the yoke, the tapered outer surface of the first coil at least partially disposed in a tapered inner surface of a second coil of the multicoil motor.

21. The ear-worn hearing device of claim 12, a first coil of the multicoil motor comprising a first portion interwound with at least a portion of a second coil of the multicoil motor, the first coil having more turns than the second coil, wherein a second portion of the first coil is wound about the first portion interwound with the second coil.

* * * * *